Oct. 21, 1952     W. R. STEWART     2,614,602
AUXILIARY SEMIPNEUMATIC TIRE FOR FLAT RIMMED WHEELS
Filed May 16, 1949
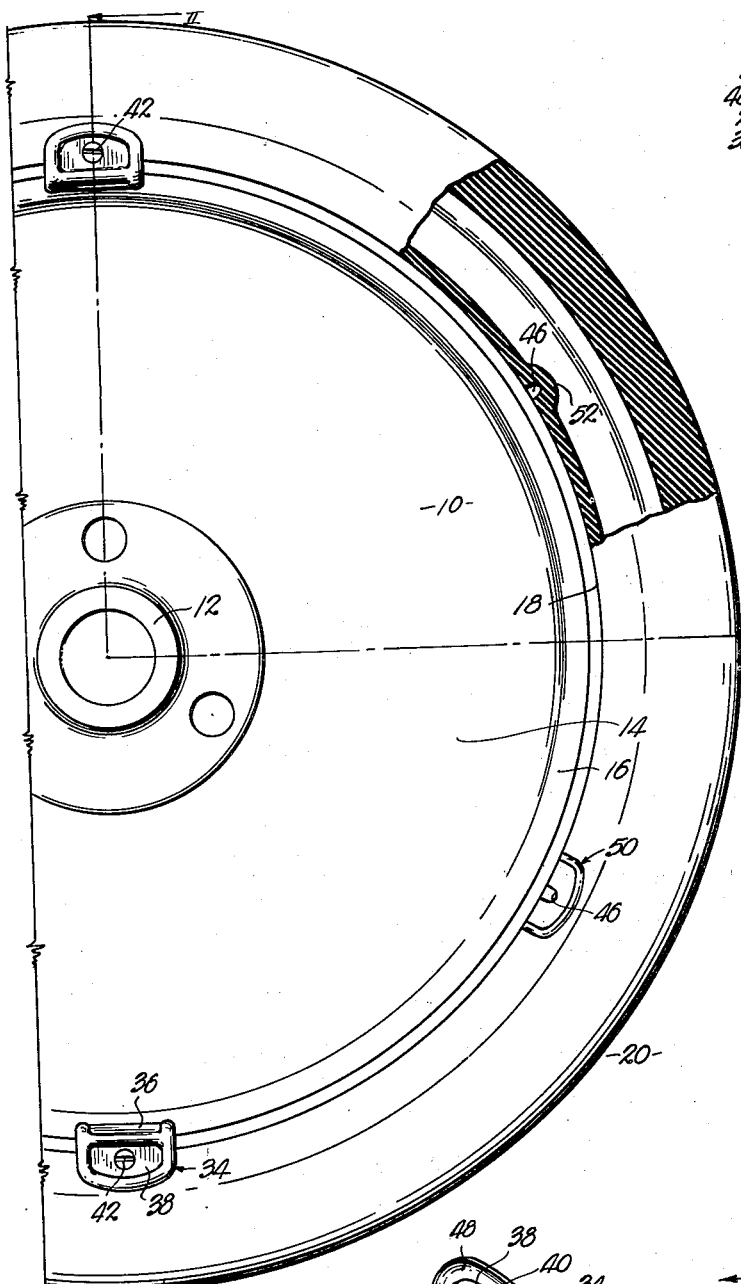
Fig. 1.
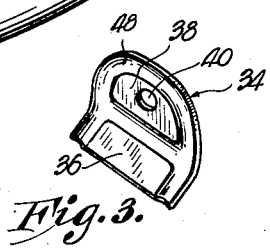
Fig. 3.
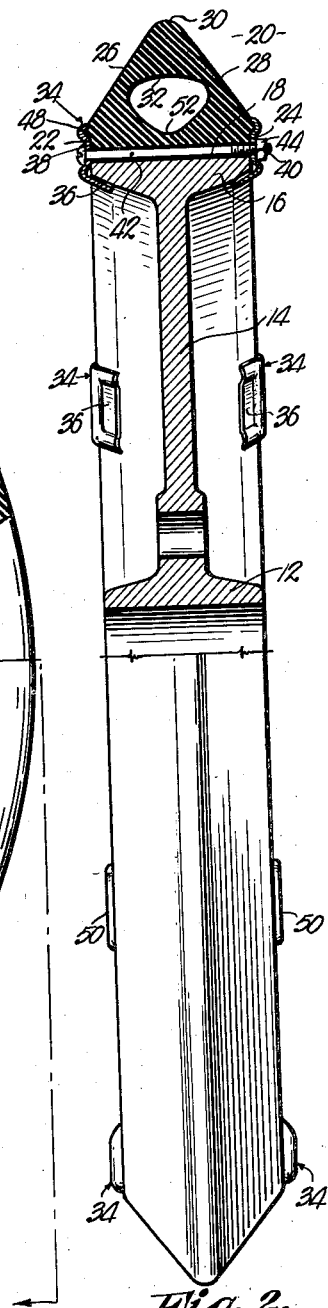
Fig. 2.
INVENTOR.
Wayne R. Stewart
BY: ATTORNEY.

Patented Oct. 21, 1952

2,614,602

UNITED STATES PATENT OFFICE 2,614,602

AUXILIARY SEMIPNEUMATIC TIRE FOR FLAT RIMMED WHEELS

Wayne R. Stewart, Hutchinson, Kans.

Application May 16, 1949, Serial No. 93,535

1 Claim. (Cl. 152—385)

This invention relates broadly to improvements in farm implements and particularly grain drills. It is common knowledge that drills are usually provided with a plurality of press-wheels mounted in trailing relationship to the main portion of the implement, designed to ride along the freshly covered rows of seed to press the earth tightly around the seed through the inherent weight of the wheels themselves and the mounting structure therefor.

The subject matter of this invention therefore, relates to improving said press-wheels.

It is the most important object of the present invention to provide a tire for flat rimmed wheels of the above mentioned character that constitutes a continuous rubber-like band that tightly circumscribes the rim, there being a plurality of releasable elements for quickly attaching and detaching the tire and holding the same in place on the rim.

Another important object of the present invention is the provision of a tire for rims of wheels as above set forth, the attaching means comprising a plurality of opposed members spaced around the circumference of the tire and rim and having interconnecting means adapted to draw the two members together into clamping relationship with respect to the proximal marginal edges of the tire and rim.

Other important objects of the present invention relate to the way in which the tire is provided with a transverse groove for receiving the bolt or the like that interconnects the clamping members; the way in which the clamps and the tire are provided with complementary interconnecting means to assure that the tire cannot slip circumferentially with respect to the rim; and the particular formation of the tire itself to render the same semi-pneumatic and to operate in the pressing action to present a desired seed bed when the drill is being used.

In the drawing:

Figure 1 is a fragmentary, side-elevational view of a conventional flat rimmed wheel showing my auxiliary semi-pneumatic tire operably mounted thereon, parts being broken away and in section to reveal details of construction.

Figure 2 is a transverse, cross-sectional view taken on irregular line II—II of Fig. 1, looking in the direction of the arrows; and Figure 3 is a perspective view of one of the clamping elements entirely removed from the tire and wheel.

Various attempts have been made to not only form press-wheels for grain drills to present a desired seed bed, but to provide a wheel having a rubber-like rim for various purposes.

Primarily, the object of substituting rubber for steel or other metallic substances for such press-wheels is to eliminate formation of the damp earth on the circumference of the wheel resulting in incomplete pressing action. This earth is sometimes removed by means of scraper plates but for the most part, it is virtually impossible, when using steel wheels, to maintain the circumferences thereof completely clean at all times whereby all of the wheels will operate satisfactorily in pressing the earth around the seed.

It is desirable, therefore, to provide a rubber-like tire for the many steel wheels that are presently in use and also to provide a replaceable tire whereby the drill owner may quickly and easily substitute an entirely new set of tires when the same becomes necessary.

A conventional, metallic wheel is shown in the drawing and broadly designated by the numeral 10. This wheel is provided with a hub 12 having a disc 14 extending radially therefrom and a rim 16 circumscribing the outermost periphery of the disc 14. Usually the hub 12, disc 14 and rim 16 are cast integrally and the outermost surface 18 of the rim 16 is substantially flat.

A tire, broadly designated by the numeral 20, is provided for the wheel 10 and comprises a continuous band adapted to tightly circumscribe the flat surface 18 of the rim 16. The tire 20 has a pair of opposed, parallel side walls 22 and 24 continuous with the proximal edges of the rim 16 and perpendicular to the flat surface 18 thereof. From the sides 22 and 24, tire 20 has side portions 26 and 28 respectively that converge as the outermost periphery of tire 20 is appproached.

The apex 30 of the tire is slightly rounded as clearly indicated in Fig. 2. A continuous channel 32 is formed in the tire 20 for purposes hereinafter to be made clear.

The means for quickly and easily mounting and holding the tire 20 upon the wheel 10 constitutes a plurality of fastening elements 32 arranged in opposed pairs and spaced around the circumference of the rim 16 and the tire 20. These elements 34 are each substantially L-shaped having a short leg 36 that overlaps a portion of the rim 16 at that face thereof opposite to the flat face 18. The elements 34 also have a longer leg 38 perforated as at 40 and adapted to overlie the proximal side wall 22 or 24 as the case may be of the tire 20. The opposed clamping elements 34 are interconnected by a transverse bolt 42 having a nut 44 threaded on one end thereof.

Bolt 42 passes through the openings 40 and the elements 34 and lies flatly against the surface 18 of rim 16 within a groove 46 formed in the tire 20. It is clear that as nut 44 is drawn tightly, the opposed elements 34 will be drawn together into tight clamping relationship, not only with the marginal edges of the rim 16 but with the side walls 22 and 24 of the tire 20. Since tire 20 is preferably made from rubber or other resilient material, the legs 38 of the members 34 will be held in compressing relationship with the walls 22 and 24.

To the end that the tire 20 will not slip or rotate relative to the rim 16, the leg 38 of each element 34, is provided with a marginal groove 48 for receiving a complementary substantially U-shaped rib 50 formed on the side walls 22 and 24 of tire 20. When the nut 44 is drawn tight on bolt 42, the ribs 50 will become seated within the grooves 48 and the tire 20 positively held against relative movement in any direction with respect to the rim 16.

It is also apparent that through the provision of clamping elements 34, the tire 20 cannot become displaced laterally with respect to the surface 18 of rim 16. Through the provision of the cavity 32 in the tire 20 that is preferably evacuated of air at the time of molding, tire 20 will be rendered at least semi-pneumatic and as the same rolls along any moist earth that tends to cling to the surfaces of the tire 20, will break away as the tire 20 yields under pressure.

To the end that cavity 32 is maintained slightly spaced from the transverse slots 46, the innermost wall of the latter protrudes slightly as at 52 into the cavity 32. It is also apparent that the area of greatest wear in the tire 20 is adjacent the rounded periphery 30 thereof and, therefore, the cavity 32 is spaced a considerable distance inwardly from such edge 30.

It has been found that through the provision of a tire having substantially V-shaped cross-sectional contour with a rounded apex, the seed bed will be formed in a most advantageous manner. The earth will not only be pressed tightly downwardly against the individual seeds but will be pressed in an outwardly diverging ditch for collecting moisture and enhancing germination of the seed. A tire thus formed has long-lasting qualities but after the same has become worn to a point where replacement is necessary, it is a simple matter to loosen the bolts 42, remove the elements 34 and slide the old tire 20 from place around the rim 16 to substitute a new tire.

It is also appreciated that wheels of existing grain drills may vary in shape and size from that herein illustrated but it is believed obvious that the innermost periphery of the tire 20 may well be formed to conform with the contour of the surface 18 of rim 16.

Many other advantages will result from use of detachable tires forming the subject matter hereof and manifestly those that fairly come within the scope of the appended claim are contemplated hereby.

Having thus described the invention, what is claimed as new and desired to be secured by Letters Patent is:

In a wheel having a rigid, circular rim, substantially triangularly shaped in transverse cross-section, the outermost face of the rim being transversely flat, the innermost face of the rim having a pair of inclined, marginal surfaces diverging as the opposed peripheral edges of the rim are approached, and a resilient tire surrounding the rim having a flat innermost face bearing against said outermost face of the rim and a pair of opposed side walls contiguous with said edges of the rim, said innermost face of the tire having a number of spaced, transverse grooves, each side wall of the tire having a substantially U-shaped rib adjacent each groove respectively, means for attaching the tire to the rim comprising a pair of opposed, separate, substantially L-shaped, metallic clamping elements for each groove respectively; a bolt between the tire and rim within each groove respectively and joining each pair of elements respectively, each element having a short leg flatly engaging the proximal marginal surface of the rim and a long leg engaging the proximal side wall of the tire, each long leg having a bolt-receiving perforation and a substantially U-shaped groove partially surrounding the perforation thereof and facing the tire for receiving a rib on the tire; and a nut on each bolt respectively for drawing the short legs of the elements tightly against said marginal surfaces of the rim to pull the tire tightly against said flat face of the rim, and to compress the tire between the elements, whereby to seat the ribs in the U-shaped grooves of the long legs of the elements and thereby hold the tire against lateral displacement from the rim as well as cooperate with the bolts in the transverse grooves to hold the tire against rotation with respect to the rim.

WAYNE R. STEWART.

REFERENCES CITED

The following references are of record in the file of this patent:

UNITED STATES PATENTS

| Number | Name | Date |
|---|---|---|
| 696,391 | Cole | Mar. 25, 1902 |
| 921,174 | Snyder | May 11, 1909 |
| 1,106,748 | Stungo | Aug. 11, 1914 |
| 1,396,515 | McClevey | Nov. 8, 1921 |